(12) United States Patent
Hamada et al.

(10) Patent No.: US 7,069,697 B2
(45) Date of Patent: Jul. 4, 2006

(54) DOOR GLASS RUN

(75) Inventors: Tomonori Hamada, Kariya (JP);
Manabu Ushiro, Okazaki (JP);
Hiroyasu Kozawa, Aichi (JP); Manabu Toki, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/899,095

(22) Filed: Jul. 6, 2001

(65) Prior Publication Data

US 2002/0002796 A1    Jan. 10, 2002

(30) Foreign Application Priority Data

Jul. 6, 2000  (JP) .............................. 2000-205713

(51) Int. Cl.
*E05D 15/16*    (2006.01)

(52) U.S. Cl. .............................. 49/428; 49/441; 49/414

(58) Field of Classification Search .................. 49/440, 49/441, 414, 415, 419, 428, 489.1, 495.1
See application file for complete search history.

(56) References Cited

U.S. PATENT DOCUMENTS

| | | | | |
|---|---|---|---|---|
| 4,663,888 A | * | 5/1987 | Okamoto ..................... 49/441 |
| 4,884,370 A | | 12/1989 | Nozaki et al. | |
| 4,908,989 A | | 3/1990 | Omura et al. | |
| 4,920,699 A | | 5/1990 | Nagata et al. | |
| 4,934,101 A | * | 6/1990 | Hannya et al. ............... 49/502 |
| 5,014,464 A | | 5/1991 | Dupuy et al. | |
| 5,085,006 A | * | 2/1992 | Hayashi et al. ............ 49/482.1 |
| 5,095,655 A | * | 3/1992 | Warren ........................ 49/374 |
| 5,217,786 A | * | 6/1993 | Keys ........................... 428/122 |
| 5,414,961 A | * | 5/1995 | Tessier ......................... 49/441 |
| 5,493,814 A | * | 2/1996 | Christian .................... 49/479.1 |
| 5,651,217 A | * | 7/1997 | Mesnel ......................... 49/441 |
| 5,817,414 A | | 10/1998 | Ando | |
| 6,250,017 B1 | * | 6/2001 | Tessier ......................... 49/440 |
| 6,412,226 B1 | * | 7/2002 | Nozaki et al. ................ 49/441 |
| 6,485,663 B1 | * | 11/2002 | Dover ..................... 264/173.17 |

FOREIGN PATENT DOCUMENTS

| | | |
|---|---|---|
| DE | 689 07478 T2 | 7/1993 |
| DE | 195 35 796 A1 | 3/1996 |
| GB | 2 334 064 | 8/1999 |
| JP | 49-56324 | 5/1974 |
| JP | 53-30623 | 8/1977 |
| JP | 57-45416 | 3/1982 |

(Continued)

*Primary Examiner*—Gregory J. Strimbu
(74) *Attorney, Agent, or Firm*—Birch, Stewart, Kolasch & Birch, LLP.

(57) ABSTRACT

A door glass run includes a door glass run body having a U-shaped cross section, and a pair of lip portions each one of the lip portions extending from opposite sides of an opening edge of the door glass run body toward a bottom face portion of the door glass run body and effective to slidably contact with the door glass. The lip portions have lengths individually set so that, even if the door glass vibrates in the door glass run, the lip portions will not be spaced away from the door glass. Alternatively, a protrusion is provided on an inner wall face of the door glass run body. A height of the protrusion is set so that, even if the door glass vibrates, an end portion of one lip portion closest to the protrusion does not contact with an inner wall face of the door glass run body.

3 Claims, 7 Drawing Sheets

FOREIGN PATENT DOCUMENTS

| | | |
|---|---|---|
| JP | 59-94916 | 6/1984 |
| JP | 64-52923 | 3/1989 |
| JP | 4-12808 | 3/1992 |
| JP | Y2412808 | 3/1992 |
| JP | 5-56544 | 7/1993 |
| JP | 7-061240 | 3/1995 |
| JP | 7-266882 | 10/1995 |
| JP | 9-039581 | 2/1997 |
| JP | 9-309342 | 12/1997 |
| JP | 10-100686 | 4/1998 |
| JP | 10-119583 | 5/1998 |
| JP | 10-181349 | 7/1998 |
| JP | 10-309944 | 11/1998 |
| JP | 11-198661 | 7/1999 |
| JP | 11-240337 | 9/1999 |
| JP | 2000-16090 | 1/2000 |
| JP | 2000-280755 | 10/2000 |

* cited by examiner

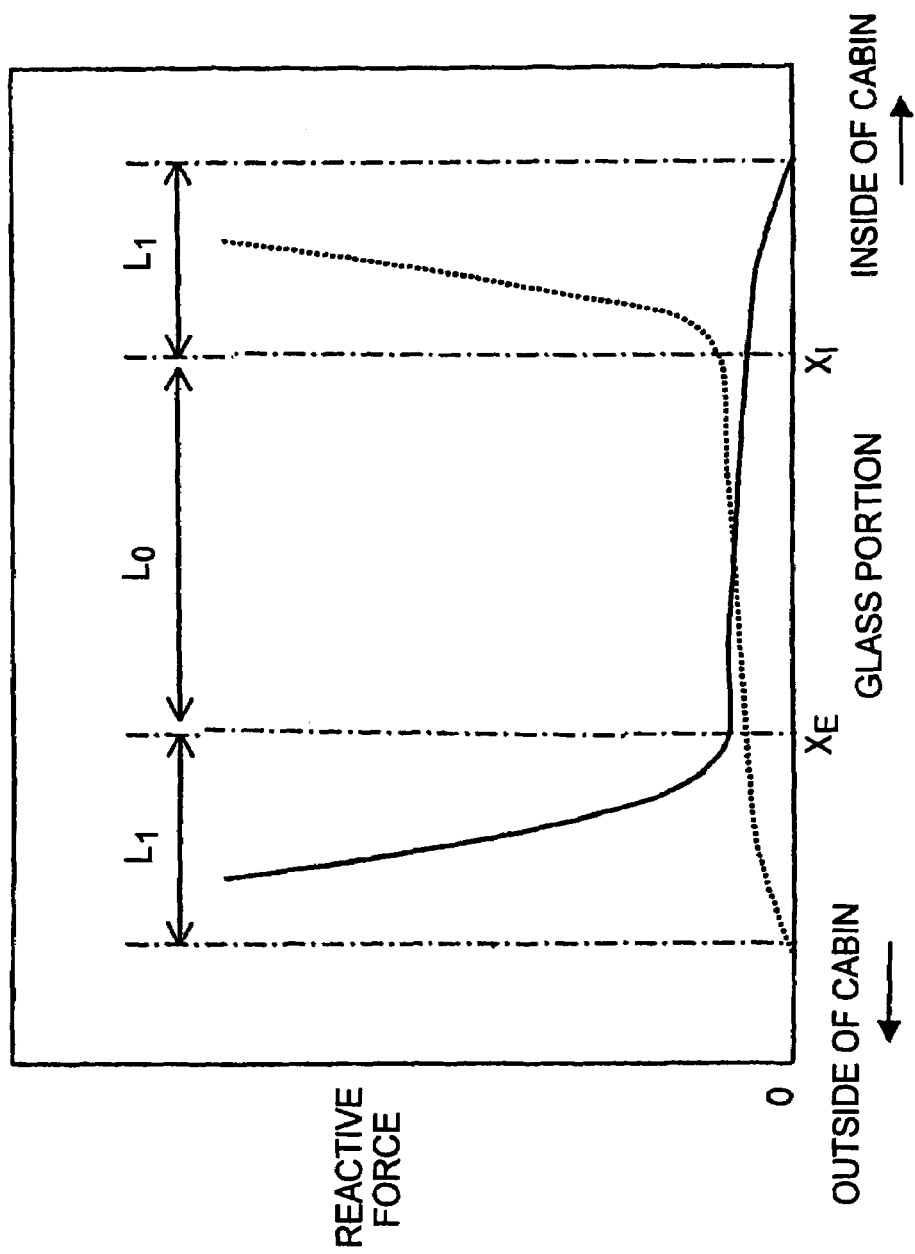

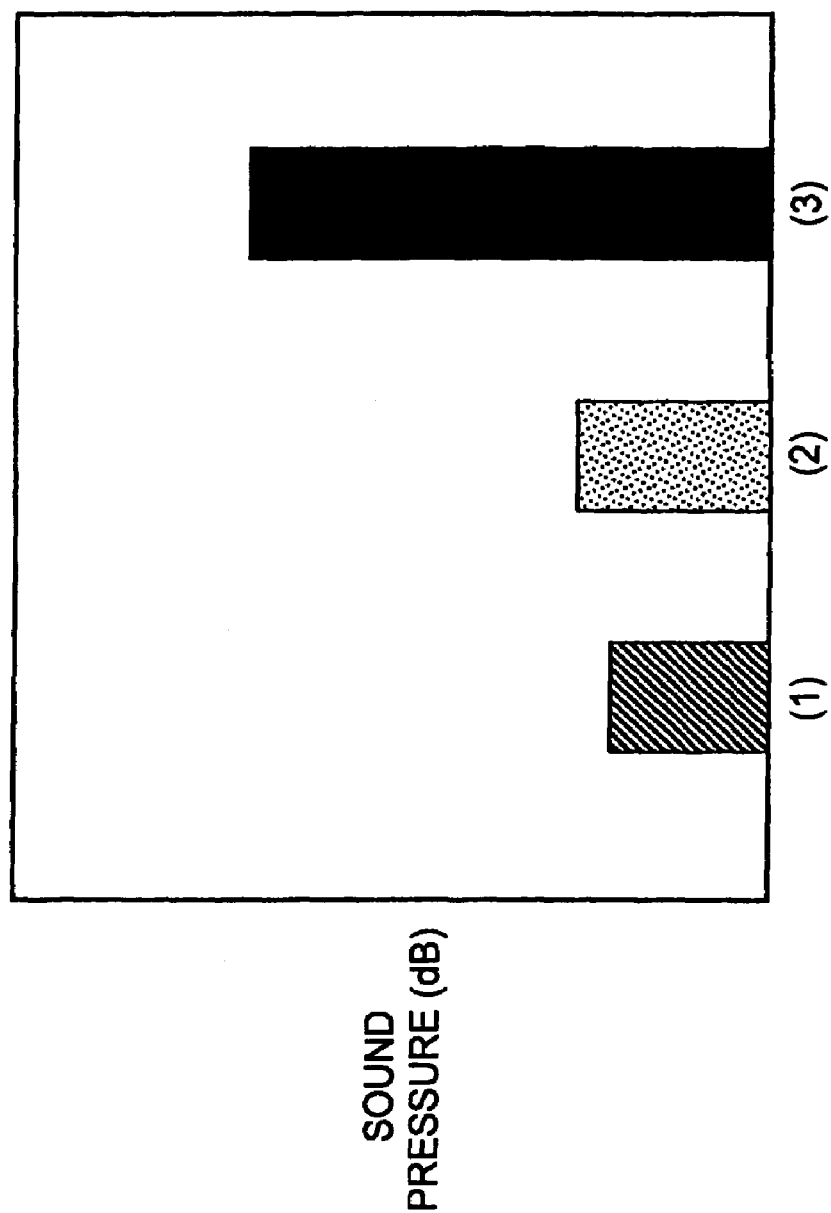

DOOR GLASS RUN

BACKGROUND OF THE INVENTION

1) Field of the Invention

This invention relates to a door glass run attached along an inner periphery of a door sash of a vehicle, and more particularly to a door glass run suitable for use with a door for an automobile.

2) Description of the Related Art

Conventionally, as shown in FIGS. 5 and 6, a run channel (door glass run) 103 formed from a resilient body such as, for example, rubber is attached along an inner periphery of a door sash 1 for an automobile. The run channel 103 guides a door glass 2 for up and down movement and seals between an outer peripheral edge of the door glass 2 and the door sash 1 when the door glass 2 is closed.

As shown in FIG. 6, the door sash 1 has an opening such that it has a substantially U-shaped cross section, and a pair of swollen portions 1a, 1b are formed on a side wall face (outer wall) on the outer side with respect to the cabin and the other side wall face (inner wall) on the inner side with respect to the cabin, respectively. The run channel 103 has a channel body 103A having an opening such that it has a substantially U-shaped cross section, and a pair of outer side lips 103a, 103b are provided on the opposite outer side faces of the channel body 103A. The channel body 103A is inserted into the door sash 1 until the outer side lips 103a, 103b are engaged with the swollen portions 1a, 1b of the door sash 1 to lock the run channel 103 to the door sash 1.

A pair of inner side lips 103c, 103d are provided in an opposing relationship to each other on the opposite inner side faces adjacent the opening edges of the run channel 103 such that they extend in a curved configuration toward the bottom face of the run channel 103. Consequently, the inner side lips 103c, 103d are held in sliding or pressing contact with an end edge of the door glass 2 to guide or hold the end edge of the door glass 2.

A recess (notch) 103h is formed between the inner side lip 103c and an inner side wall face 103e of the run channel 103. Where the notch 103h is provided in this manner, the bending base point of the inner side lip 103c is displaced toward the outer side to substantially extend the length of the inner side lip 103c thereby to lower the rigidity and thus raise the flexibility of the inner side lip 103c so that the door glass 2, which slides on the inner side lip 103c, may move up and down smoothly.

With the prior art described above, however, there is the possibility that rattling noise may be generated by vibration of the door glass 2 when the door is closed violently or when the vehicle runs on an uneven road.

In other words, when the door glass 2 is not in a vibrating state, the door glass 2 is held between the inner side lips 103c, 103d on the opposite sides thereof and the end of the inner side lips 103c, 103d is spaced away from the inner side wall face 103e of the run channel 103 as seen in FIG. 7(a). However, if the door glass 2 vibrates and thus moves rightwardly from the position shown in FIG. 7(a), then the door glass 2 is spaced away from the inner side lips 103c as seen in FIG. 7(b), but if the door glass 2 vibrates and moves leftwardly from the position shown in FIG. 7(a), then the rear face at the end of the inner side lips 103c and the inner side wall face 103e are brought into contact with each other as seen in FIG. 7(c).

Then, when the door glass 2 moves from the position shown in FIG. 7(b) to the position shown in FIG. 7(a), collision sound is generated by the contact between the door glass 2 and the end portion of the inner side lip 103c, and when the door glass 2 moves from the position shown in FIG. 7(a) to the position shown in FIG. 7(c), collision sound between the end portion of the inner side lip 103c and the inner side wall face 103e is generated. Accordingly, if the door glass 2 vibrates in the leftward and rightward directions in FIGS. 7(a) to 7(c), such collision sound is generated repetitively, and consequently, door glass rattling noise is generated.

Japanese Utility Model Publication No. HEI 4-12808 discloses a run channel wherein a protrusion is provided at a position of an inner side wall face of a run channel body which opposes an end portion of a lip which grasps a door glass. If the door glass vibrates in the run channel of Japanese Utility Model Publication No. HEI 4-12808, then although the width of the vibrations of the door glass is reduced by the protrusion, since the end portion of the lip collides with the protrusion on the inner side wall face of the run channel, door glass rattling noise is generated similarly to the prior art described above.

SUMMARY OF THE INVENTION

It is an object of the present invention to provide a door glass run which can effectively suppress door glass rattling noise.

In order to attain the object described above, according to an aspect of the present invention, there is provided a door glass run comprising a door glass run body having a substantially U-shaped cross section, and a pair of lip portions extending from an opening edge of the door glass run body toward a bottom face portion of the door glass run body and slidably contacting with the door glass, the pair of lip portions having lengths individually set so that, even if the door glass vibrates in the door glass run body, the lip portions may not be spaced away from the door glass.

Accordingly, when the door sash and the door glass are sealed with the door glass run, even if the door glass vibrates in the door glass run body, the lip portions are not spaced away from the door glass but normally remain in contact with the door glass. Therefore, door glass rattling noise can be suppressed.

According to another aspect of the present invention, there is provided a door glass run comprising a door glass run body having a substantially U-shaped cross section, and a pair of lip portions extending from an opening edge of the door glass run body toward a bottom face portion of the door glass run body and slidably contacting with the door glass, a protrusion being provided on an inner wall face of the door glass run body in an opposing relationship to a rear face of one of the lip portions, the protrusion being disposed at a position nearer to a base portion of the lip portion than a position at which the lip portion and the door glass contact with each other and the protrusion having a height set so that, even if the door glass vibrates, an end portion of the lip portion may not contact with the inner face of the door glass run body.

Accordingly, since the end of the lip portion do not contact with the inner wall face of the door glass run body, door glass rattling sound can be suppressed.

Further, since the lip portion is supported by the protrusion provided on the inner wall face at a position nearer to the base end portion of the lip portion with respect to the position at which the lip portion and the door glass contact with each other, that is, at the position at which a moment of bending which acts in a direction in which the lip portion is spaced away from the inner wall face of the door glass run body is exerted, even if the lip portion and the protrusion collide with each other as a result of vibration of the door glass, the collision is comparatively weak. Also from this, door glass rattling noise can be reduced.

In the door glass run, the pair of lip portions have lengths individually set so that, even if the door glass vibrates in the door glass run body, the lip portions may not be spaced away from the door glass. Accordingly, when the door sash and the door glass are sealed with the door glass run, even if the door glass vibrates in the door glass run body, the lip portions are not spaced away from the door glass but normally remain in contact with the door glass. Therefore, door glass rattling noise can be suppressed.

Further, in the door glass run, a notch portion is formed in a concave with respect to the inner wall face between a base end portion of the lip portion and the inner wall face of the door glass run body, and the depth of the notch portion is set equal to or less than a predetermined depth.

Accordingly, the contact area when the lip portion is deflected and brought into contact with the inner wall face of the door glass run body can be reduced, and door glass rattling noise can be reduced.

Further, where the depth of the notch portion is set equal to or smaller than 0.5 mm, the advantage just described can be achieved with certainty.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1(a) and 1(b) are schematic sectional views showing a configuration of a door glass run according to an embodiment of the present invention and wherein FIG. 1(a) shows the door glass run in a state wherein it is not in contact with a door glass and FIG. 1(b) shows the door glass run in another state wherein it is in contact with the door glass;

FIG. 2 is a diagram illustrating a relationship between the position of the door glass and the reactive force acting upon the door glass from a lip portion;

FIG. 3 is a diagram illustrating a reduction effect of door glass rattling noise;

FIGS. 4(a) and 4(b) are for the explanation of operation of a modification to the embodiment of the present invention and wherein FIG. 4(a) is schematic partial sectional view where the depth of a notch portion is comparatively shallow and FIG. 4(b) is schematic partial sectional view where the depth of the notch portion is comparatively deep;

DESCRIPTION OF THE PREFERRED EMBODIMENT (a) Embodiment of the Present Invention

In the following, an embodiment of the present invention is described with reference to the drawings. It is to be noted that, in the present embodiment, the door glass run of the present invention is applied to an automobile. The door glass run of the present embodiment is shown in from FIG. 1(a) to FIG. 4(b). Also FIG. 5 with reference to which the conventional door glass run is described hereinabove is referred to in the description of the present embodiment.

Figure 5:
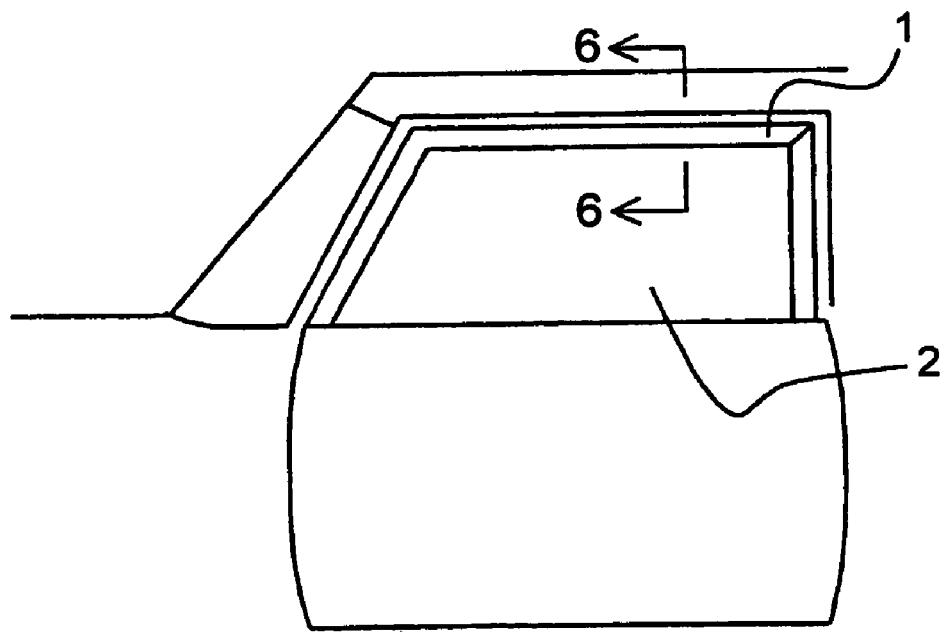
FIG. 5 is a side view of a configuration of a common automobile door.
Figure 6:
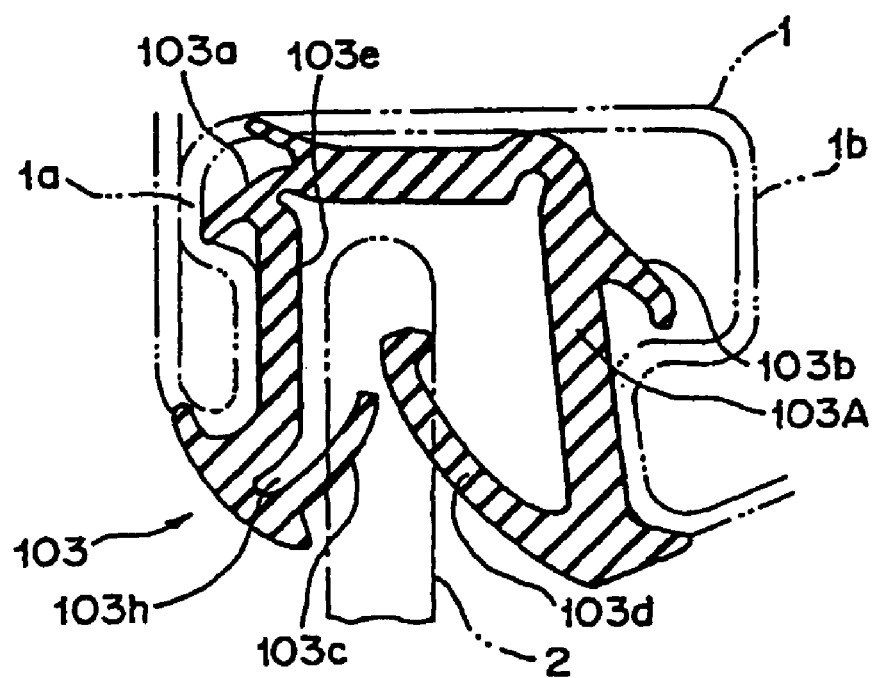
FIG. 6 is a schematic sectional view taken along line 6—6 of FIG. 5 showing a configuration of a conventional door glass run.
Figure 7A:
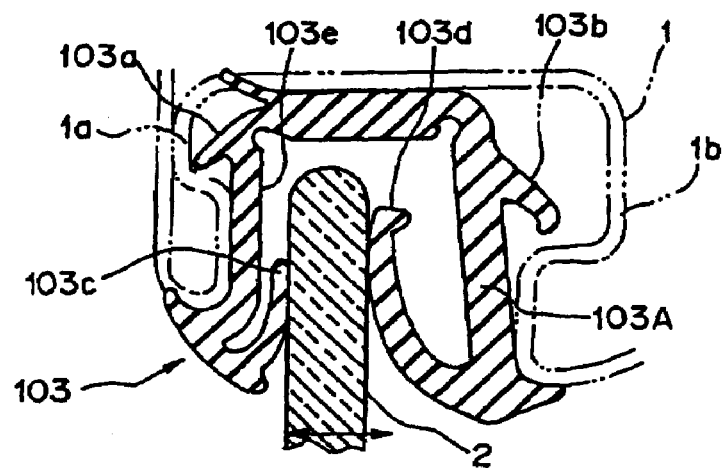
FIGS. 7(a) to 7(c) are sectional views taken along line 6—6 of FIG. 5 illustrating different states of the door glass run when the door glass vibrates.
Figure 7B:
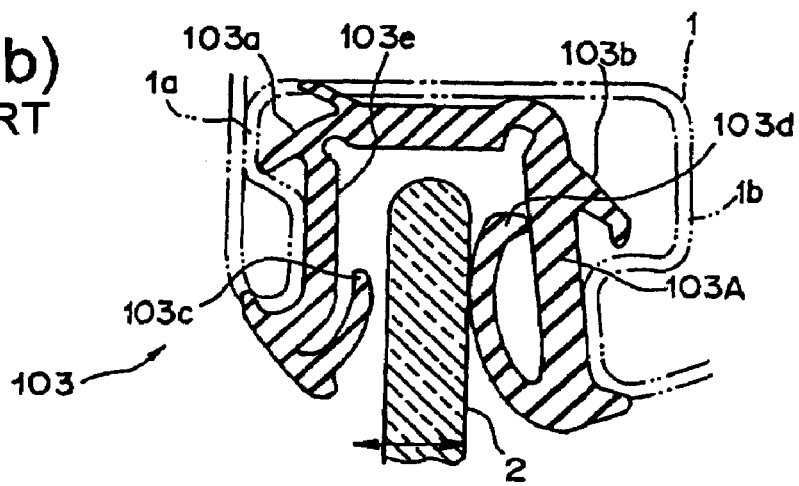
Figure 7C:
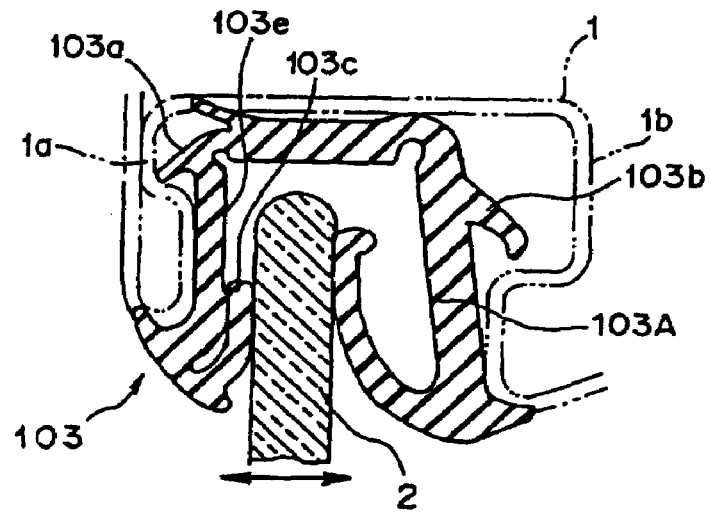

The run channel (door glass run) 3 of the present embodiment is attached along an inner periphery of a door sash 1 of an automobile shown in FIG. 5 such that it holds the door glass 2 to guide it for up and down movement and seals between an outer peripheral edge of the door glass 2 and the door sash 1 when the door glass 2 is closed. The run channel 3 is formed from a resilient material such as, for example, rubber or elastomer so that it may slidably contact with the door glass 2 to seal the door glass 2 and allow sliding movement (up and down movement) of the door glass 2 to be performed with a low load.

Figure 1A:
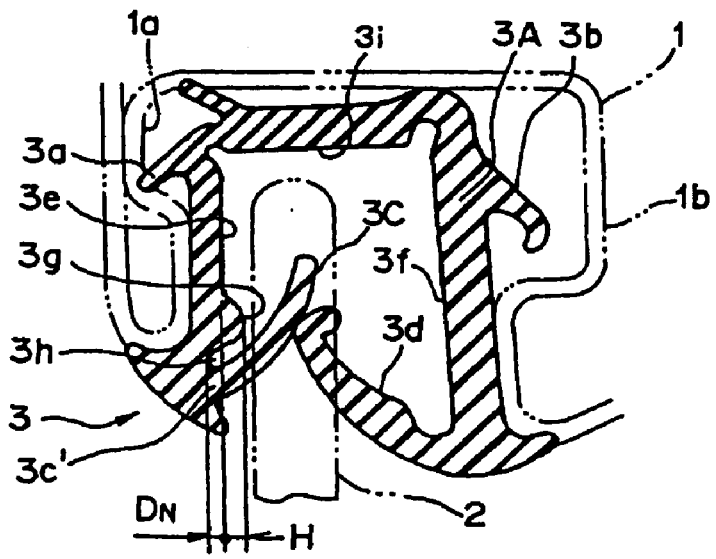
Figure 1B:
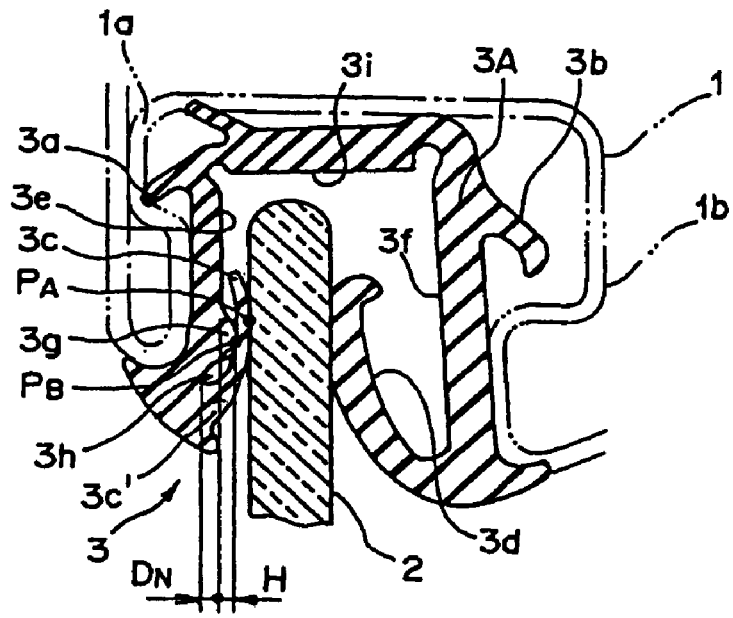

The run channel 3 has, as shown in FIGS. 1(a) and 1(b), a channel body (door glass run body) 3A having an opening such that it has a substantially U-shaped cross section, a pair of outer side lips 3a, 3b provided on the opposite outer side faces of the channel body 3A adjacent the bottom of the channel body 3A, a pair of inner side lips (lip portions) 3c, 3d provided on the opposite inner side faces of the channel body 3A, a protrusion 3g provided on an inner wall face 3e of the channel body 3A in an opposing relationship to a rear face of the inner side lip 3c on the outer side with respect to the cabin, that is, a face of the inner side lip 3c opposing to the inner wall face 3e, and a recess (notch portion, hereinafter referred to sometimes as notch) 3h formed between a base end portion 3c' of the inner side lip 3c and the inner wall face 3e.

The channel body 3A is inserted into the door sash 1 until the outer side lips 3a, 3b are inserted into a pair of swollen portions 1a, 1b on the opposite wall faces of the door sash 1 to attach the run channel 3 to the door sash 1 with its opening directed to the door glass 2. The inner side lips 3c, 3d are formed such that, as shown in FIGS. 1(a) and 1(b), they extend from the opening edge of the channel body 3A toward a bottom face portion 3i of the channel body 3A. For example, the inner side lips 3c, 3d are formed such that, as shown in FIG. 1(a), when the door glass 2 is not present between the inner side lips 3c, 3d, the inner side lip 3c on the outer side with respect to the cabin is positioned nearer to the bottom face portion 3i of the channel body 3A than the inner side lip 3d on the inner side with respect to the cabin.

Consequently, the inner side lip 3c can be formed long, and as the length of the inner side lip 3c increases, the rigidity of the inner side lip 3c decreases and the notch 3h can be formed with a reduced depth as much. Conversely speaking, if the inner side lip 3c is short, then the rigidity of the inner side lip 3c is high and the door glass 2 which slidably moves on the inner side lip 3c is acted upon by high resistance from the inner side lip 3c, and therefore, it becomes necessary to form the notch 3h deep as much.

FIG. 2 is a diagram illustrating the relationship between the position (abscissa) of the door glass 2 in the horizontal direction and the reactive force (ordinate) acting upon the door glass 2 from the inner side lips 3c, 3d, and the state wherein the reactive force is 0 (zero) corresponds to a state wherein the door glass 2 and the inner side lip 3c, 3d are spaced away from each other. Further, a solid line indicates the relationship with regard to the inner side lip 3c on the outer side with respect to the cabin, and a dotted line indicates the relationship with regard to the inner side lip 3d on the inner side with respect to the cabin.

Description is first given with attention paid to the inner side lip 3c on the outer side with respect to the cabin. As seen from the solid line curve, as the position of the door glass 2 moves to the outer side with respect to the cabin, the reactive force acting upon the door glass 2 from the inner side lip 3$c$ increases. When the door glass 2 comes to a position $X_E$, the inner side lip 3$c$ is brought into contact with the inner wall face 3$e$ of the channel body 3A [refer to FIGS. 1($a$) and 1($b$)] (this is called bottoming), and thereupon, the reactive force acting upon the door glass 2 from the inner side lip 3$c$ increases suddenly.

Similarly, when attention is paid to the inner side lip 3$d$ on the inner side with respect to the cabin, as seen from the dotted line curve, as the position of the door glass 2 moves to the inner side with respect to the cabin, the reactive force acting upon the door glass 2 from the inner side lip 3$d$ increases. Then, when the door glass 2 comes to a position $X_I$, the inner side lip 3$d$ is brought into contact (bottomed) with the other inner side face 3$f$ [refer to FIGS. 1($a$) and 1($b$)] and the reactive force of the door glass 2 acted upon by the inner side lip 3$d$ increases suddenly.

In the run channel 3, the length of the inner side lip 3$d$ is set so that, even if the inner side lip 3$c$ is bottomed with the inner wall face 3$e$ of the channel body 3A as a result of movement of the door glass 2 to the position $X_E$ and does not allow any further movement of the door glass 2 to the outer side with respect to the cabin as seen in FIG. 2, or in other words, even when the door glass 2 is moved farthest toward the inner side lip 3$c$, the end of the inner side lip 3$d$ and the door glass 2 are not spaced away from each other, that is, the reactive force is not reduced to zero.

Similarly, as shown in FIG. 2, the length of the inner side lip 3$c$ is set so that, even when the door glass 2 is positioned at the position $X_I$, that is, even when the door glass 2 is moved farthest toward the inner side lip 3$d$, the end of the inner side lip 3$c$ and the door glass 2 are not spaced away from each other.

Accordingly, even if the door glass 2 vibrates in the inside of the channel body 3A, none of the inner side lips 3$c$, 3$d$ is spaced away from the surface of the door glass 2 within a section (lip bottoming width) $L_0$ between the position $X_E$ and the position $X_I$, and therefore, collision sound (door glass rattling noise), which is generated by the door glass 2 and the inner side lips 3$c$, 3$d$ successively brought into and out of contact with each other, can be prevented.

It is to be noted here that the length of each of the inner side lips 3$c$, 3$d$ is set so that the reactive force by it may be reduced to 0 (zero) when it is moved by a predetermined length (seal width) $L_1$ away from the position $X_I$, $X_E$. Consequently, even if the door glass 2 vibrates with a magnitude greater than the section $L_0$, the inner side lips 3$c$, 3$d$ are prevented from being spaced away from the door glass 2 with certainty to assure the reactive force, that is, the door glass 2 and the inner side lips 3$c$, 3$d$ are stably held in a mutually contacting state. Consequently, the sealing property between the door glass 2 and the run channel 3 is assured and the inner side lips 3$c$, 3$d$ are prevented from moving out of contact with the door glass 2 even if the run channel 3 is deteriorated.

As described hereinabove, in an opposing relationship to the rear face of the inner side lip 3$c$ positioned in the proximity of the inner wall face 3$e$ of the channel body 3A, the protrusion 3$g$ is provided on the inner wall face 3$e$ as shown in FIGS. 1($a$) and 1($b$). The protrusion 3$g$ contacts with the lip 3$c$ when the run channel 3 supports the door glass 2 as seen in FIG. 1($b$). To this end, the position of the protrusion 3$g$ is set so that, in the condition just described, the protrusion 3$g$ contacts with the lip 3$c$ at a predetermined position $P_B$ nearer to the base portion of the inner side lip 3$c$ than a contact point $P_A$ between the inner side lip 3$c$ and the door glass 2, and the height H of the protrusion 3$g$ is set such that, in the condition described above, the end of the lip 3$c$ does not contact with the inner wall face 3$e$.

More specifically, a portion of the inner side lip 3$c$ between the base end portion 3$c'$ and the contact point $P_A$ is held between the door glass 2 and the inner wall face 3$e$ (base end portion 3$c'$) and exerts a bending moment. This signifies that the inner side lip 3$c$ between the base end portion 3$c'$ and the contact point $P_A$ is acted upon by a force to tend to move the inner side lip 3$c$ away from the inner wall face 3$e$ (protrusion 3$g$) and, even if the inner side lip 3$c$ is moved into collision with the protrusion 3$g$ from the position wherein it is spaced away from the protrusion 3$g$ as a result of vibration of the door glass 2, the collision is moderated to reduce collision sound.

On the other hand, the end portion of the inner side lip 3$c$ with respect to the contact point $P_A$ does not exert a bending moment and exhibits a free end state when the door glass 2 contacting with the inner side lip 3$c$ vibrates. Therefore, when the door glass 2 vibrates, the end portion of the inner side lip 3$c$ is acted upon by a high moment of inertia, and if the end of the inner side lip 3$c$ collides with the inner wall face 3$e$, then there is the possibility that great collision sound may be generated. However, since the height H of the protrusion 3$g$ is set so that the end portion of the inner side lip 3$c$ may not be brought into contact with the inner wall face 3$e$ as described above, generation of such great collision sound can be prevented.

Further, as described hereinabove, the notch 3$h$ is formed between the base end portion 3$c'$ of the inner side lip 3$c$ and the inner wall face 3$e$. The notch 3$h$ is originally provided to reduce the resistance acting upon the door glass 2 from the inner side lip 3$c$ when the door glass 2 moves up and down, and the resistance reduction effect described increases as the depth $D_N$ of the notch 3$h$ increases. On the other hand, as the depth $D_N$ of the notch 3$h$ decreases, the contact area of the portion of the inner side lip 3$c$ nearer to the base end portion 3$c'$ than the contacting portion with the protrusion 3$g$ with the inner wall face 3$e$ can be reduced, and therefore, contact (collision) of the inner wall face 3$e$ with the inner side lip 3$c$ can be reduced and generation of collision sound can be suppressed further effectively. In other words, the collision sound suppression effect becomes further significantly.

More specifically, although the end portion of the inner side lip 3$c$ with respect to the contacting portion with the protrusion 3$g$ is not brought into contact with the inner wall face 3$e$ due to the action of the protrusion 3$g$ as described above, the portion of the inner side lip 3$c$ nearer to the base end portion 3$c'$ than the contacting portion with the protrusion 3$g$ is sometimes deflected and pressed against the inner wall face 3$e$. The contacting area of the inner wall face 3$e$ with the inner side lip 3$c$ increases as the depth $D_N$ of the notch 3$h$ increases and the rigidity of the portion of the inner side lip 3$c$ nearer to the base end portion 3$c'$ decreases. Accordingly, as the depth $D_N$ of the notch 3$h$ decreases, the deflection of the portion of the inner side lip 3$c$ nearer to the base end portion 3$c'$ can be reduced by a greater amount and the contacting area when the inner side lip 3$c$ and the inner wall face 3$e$ contact with each other can be reduced.

It has been found from an experiment, an analysis and so forth that, where the depth $D_N$ of the notch 3$h$ is reduced equal to or less than 0.5 mm which is smaller than the depth of the conventional door glass run, both of such a resistance reduction effect and a collision sound suppression effect as described above can be achieved, and in the present embodiment, the depth $D_N$ of the notch 3$h$ is set to 0.5 mm.

It is to be noted that the protrusion 3g and the notch 3h are provided only for the inner side lip 3c, but are not provided for the inner side lip 3d. The reason is that, since the locus of the door glass 2 is positioned in the proximity of the inner wall face 3e on which the inner side lip 3c is provided as seen in FIGS. 1(a) and 1(b), the inner wall face 3e and the inner side lip 3c are liable to collide with each other, and in order to prevent the collision, the protrusion 3g and the notch 3h are provided particularly for the inner side lip 3c.

The run channel 3 of the embodiment of the present invention is configured in such a manner as described above and therefore has the following advantages. In particular, since the inner side lips 3c, 3d have lengths individually set so that they are not spaced away from the door glass 2 even if the door glass 2 vibrates, such a situation that the inner side lip 3c, 3d is spaced away from the door glass 2 once and then brought into collision with the door glass 2 does not occur, and consequently, the run channel 3 is advantageous in that occurrence of such collision of the inner side lips 3c, 3d with the door glass 2 can be prevented.

Further, for the inner side lip 3c which is positioned closely to the inner wall face 3e and therefore is liable to contact with the inner wall face 3e, the protrusion 3g is provided on the inner wall face 3e of the channel body 3A so that the inner side lip 3c collides not at the end thereof, upon which a high moment of inertia acts, with the inner wall face 3e, but at the portion thereof, which is adjacent the base end portion 3c′ and is not acted upon by a high moment of inertia, with the protrusion 3g. Consequently, the run channel 3 is advantageous in that collision sound between the inner side lip 3c and the inner wall face 3e can be reduced.

Further, since the notch depth $D_N$ of the inner side lip 3c is set equal to or less than 0.5 mm (here, to 0.5 mm), even if some deflection occurs with the inner side lip 3c due to vibration of the door glass 2 and causes the inner side lip 3c to contact with the inner wall face 3e at the portion nearer to the base end portion 3c′ than the contacting portion with the protrusion 3g, the inner side lip 3c and the inner wall face 3e contact with each other over a reduced contact area. Consequently, the run channel 3 is advantageous in that collision sound between the inner side lip 3c and the inner wall face 3e can be reduced without having a bad influence on up and down movement of the door glass 2.

Due to such a collision sound reduction effect as just described, the run channel 3 can suppress door glass rattling noise (a sound pressure) significantly as indicated by (1) in FIG. 3 when compared with door glass rattling noise (a sound pressure) caused by a conventional run channel indicated by (3) in FIG. 3.

It is to be noted that the door glass run of the present invention is not limited to that of the embodiment described above, but can be modified in various forms without departing from the scope of the present invention. For example, while, in the embodiment described above, the protrusion and the notch for reducing collision sound between the inner side lip of the channel body 3A and the inner wall face of the channel body 3A are provided only for the inner side lip 3c side on the outer side of the automobile, they may be provided alternatively on the inner side face 3f in an opposing relationship to the rear face of the inner side lip 3d on the inner side with respect to the cabin or otherwise they may naturally be provided on both of the inner side lips 3c, 3d.

Figure 4A:
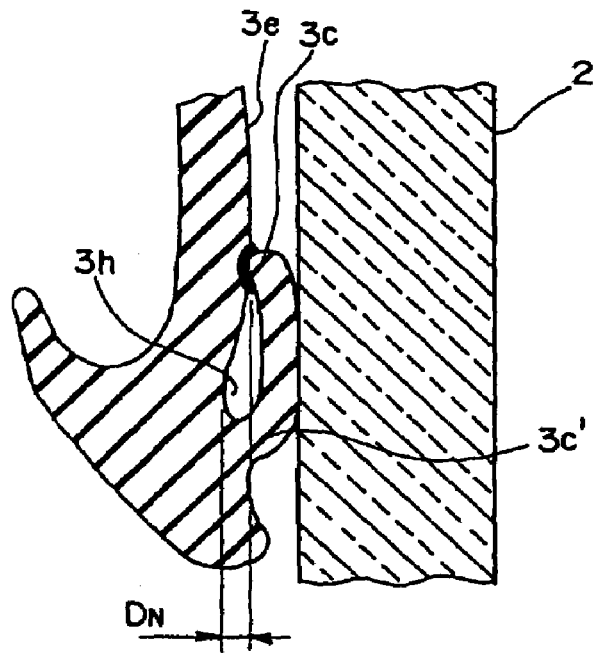
Figure 4B:
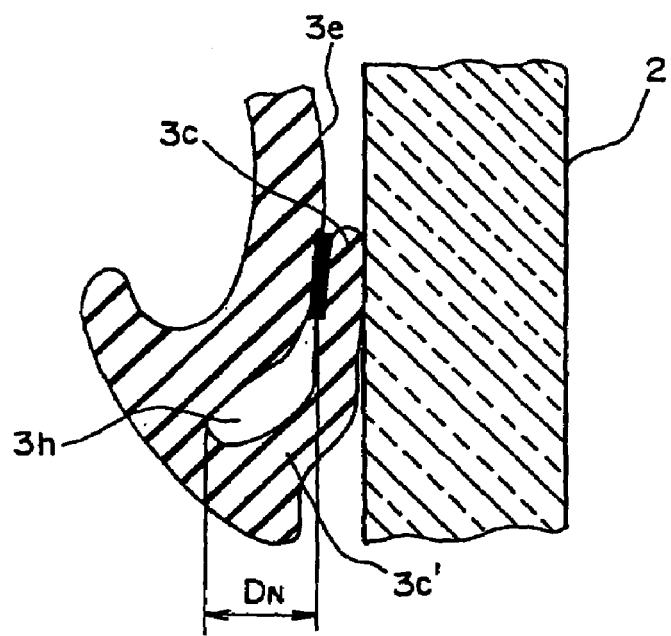

Further, a different configuration wherein no protrusion is provided on the inner wall face 3e may be used. Also where no protrusion is provided, it is effective to reduce collision sound that the notch 3h is formed with a reduced depth $D_N$ of 0.5 mm or less. In particular, between a case wherein the notch depth $D_N$ is comparatively small as seen in FIG. 4(a) and another case wherein the notch depth $D_N$ is comparatively great as seen in FIG. 4(b), the smaller notch depth $D_N$ decreases the contact area between the inner side lip 3c and the inner wall face 3e indicated by a thick line in FIGS. 4(a) and 4(b) and therefore is effective to reduce collision sound by contact (collision) between the inner side lip 3c and the inner wall face 3e. Also in such an instance as just described, as indicated by (2) in FIG. 3, door glass rattling noise can be reduced when compared with that of the conventional door glass run.

Also it is possible to provide a protrusion on the inner wall face 3e to make the depth $D_N$ of the notch 3h greater than 0.5 mm. Also in this instance, the end of the inner side lip 3c does not collide with the inner wall face 3e, and consequently, door glass rattling noise can be reduced sufficiently when compared with that of the conventional door glass run. In order to make the depth $D_N$ of the notch 3h equal to or smaller than 0.5 mm, it is effective to configure the inner side lip 3c so as to be positioned nearer to the bottom face portion of the channel body 3A than the inner side lip 3d and form the inner side lip 3c comparatively long as in the embodiment described hereinabove. In the case described above, however, there is no necessity for the configuration just described, and therefore, it is possible to configure the inner side lip 3d so as to be positioned nearer to the bottom face portion of the channel body 3A than the inner side lip 3c.

Further, even if no protrusion is provided on the inner wall face and besides the depth $D_N$ of the notch 3h is not limited to equal to or less than 0.5 mm, collision between the door glass 2 and the inner side lips 3c, 3d is eliminated only by setting the lengths of the inner side lips 3c, 3d so that each of the inner side lips 3c, 3d may not be spaced away from the door glass 2, and therefore, door glass rattling noise can be suppressed.

Further, the door glass run of the present invention can be applied not only to an automobile but also to any other vehicle.

What is claimed is:

1. A door glass run attached to a door sash of a vehicle for sealing between said door sash and a door glass having a first surface and a second surface, comprising:

a door glass run body, formed into a substantial U-shaped cross section which has a first side portion, a second side portion and a bottom face portion;

a first lip extending from an edge of the first side portion toward said bottom face portion and slidably contacting the first surface of said door glass; and a second lip extending from an edge of the second side portion toward said bottom face portion and slidably contacting the second surface of said door glass, wherein a length of said first lip is set so that, when said door glass presses said second lip against said second side portion, said first lip contacts the first surface of said door glass, a length of said second lip is set so that, when said door glass presses said first lip against said first side portion, said second lip contacts the second surface of said door glass, and at least one of said lips includes a concave notch portion at a base end portion thereof having a depth equal to or less than 0.5 mm.

2. The door glass run as claimed in claim 1 wherein the depth of the notch portion is equal to 0.5 mm.

3. A door glass run attached to a door sash of a vehicle for sealing between said door sash and a door glass, comprising:

a door glass run body having a substantially U-shaped cross section and including a bottom wall and first and second legs projecting from said bottom wall, said first and second legs each having an end portion;

first and second lips extending from said first and second end portions toward said bottom wall, said first lip having a proximal end connected to said first leg end portion, a distal end portion and a center portion between said distal end portion and said proximal end, said first and second lips adapted to slidingly engage the door glass, wherein said first lip is configured to maintain contact with said door glass when said door glass presses said second lip against said second leg, said second lip is configured to maintain contact with said door glass when said door glass presses said first lip against said first leg, and said first leg has a concave notch adjacent and partially defined by the proximal end of said first lip, said notch having a depth less than or equal to 0.5 mm.

* * * * *